US007559288B2

(12) United States Patent
Amidon

(10) Patent No.: US 7,559,288 B2
(45) Date of Patent: Jul. 14, 2009

(54) RECOVERABLE OPTICAL FIBER TETHERED BUOY ASSEMBLY

(75) Inventor: Charles Philip Amidon, Portsmouth, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 120 days.

(21) Appl. No.: 11/829,987

(22) Filed: Jul. 30, 2007

(65) Prior Publication Data

US 2008/0029015 A1 Feb. 7, 2008

(51) Int. Cl.
*B63G 8/38* (2006.01)
*H01Q 1/34* (2006.01)

(52) U.S. Cl. ...................................... 114/328; 343/709

(58) Field of Classification Search ................. 114/312, 114/326–329; 441/6–33; 340/850; 343/709, 343/710; 367/3–5, 131, 141

See application file for complete search history.

(56) References Cited

U.S. PATENT DOCUMENTS

| | | | |
|---|---|---|---|
| 2,273,497 A | | 2/1942 | Rivera |
| 3,972,046 A | | 7/1976 | Lombardi |
| 3,972,047 A | | 7/1976 | Lombardi |
| 5,291,194 A | * | 3/1994 | Ames ......................... 340/850 |
| 5,319,376 A | | 6/1994 | Eninger |
| 5,377,165 A | * | 12/1994 | LaPointe et al. ............ 367/134 |
| 5,748,102 A | | 5/1998 | Barron |
| 6,058,874 A | | 5/2000 | Glenning et al. |
| 6,907,839 B2 | | 6/2005 | Kruger et al. |

* cited by examiner

*Primary Examiner*—Ajay Vasudeva
(74) *Attorney, Agent, or Firm*—James M. Kasischke; Jean-Paul A. Nasser; Michael P. Stanley

(57) ABSTRACT

The invention as disclosed is a recoverable tethered optical fiber buoy and winch assembly that is mounted to the back of the sail or the back of an aft non-moving surface of an underwater vehicle and housed in a configuration to provide very little additional drag to the underwater vehicle when the assembly is not deployed. The invention provides a capability to connect ocean surface visual or radio frequency sensors to an underwater mobile platform with a very high data rate link that is retrievable.

8 Claims, 4 Drawing Sheets

16
14
18

22
20
18
24
12
14
16
10

RECOVERABLE OPTICAL FIBER TETHERED BUOY ASSEMBLY

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention is directed to tethered buoys. In particular, the present invention is directed to a recoverable optical fiber tethered buoy for use with underwater vehicles. The invention provides a capability to connect ocean surface visual or radio frequency sensors to an underwater mobile platform with a very high data rate link that is retrievable.

(2) Description of the Prior Art

There have been efforts to equip underwater vehicles with buoyant sensors and antennas on a tether that are deployed to the surface for a period of time and then winched back to the underwater vehicle. Prior art winches and buoys are relatively large and cannot be incorporated in the design of next generation underwater vehicles or current underwater vehicles that are near their maximum weight. What is needed is a smaller winch and buoy system that can be mounted to the aft of the sail of a next generation underwater vehicle to provide the critical capabilities of a recoverable tethered buoyed sensor and antenna.

SUMMARY OF THE INVENTION

It is a general purpose and object of the present invention to provide a winch and buoy assembly that is small enough to be incorporated into the design of the next generation underwater vehicle and will provide the critical capabilities of a recoverable tethered buoyed antenna or sensor.

The above object is accomplished with the present invention by a recoverable optical fiber tethered buoy and winch assembly that is mounted to the back of the sail or the back of an aft non-moving surface of an underwater vehicle and is housed in a configuration that causes minimal additional drag to the underwater vehicle.

BRIEF DESCRIPTION OF THE DRAWINGS

A more complete understanding of the invention and many of the attendant advantages thereto will be more readily appreciated by referring to the following detailed description when considered in conjunction with the accompanying drawings, wherein like reference numerals refer to like parts and wherein.

DETAILED DESCRIPTION

Figure 1:
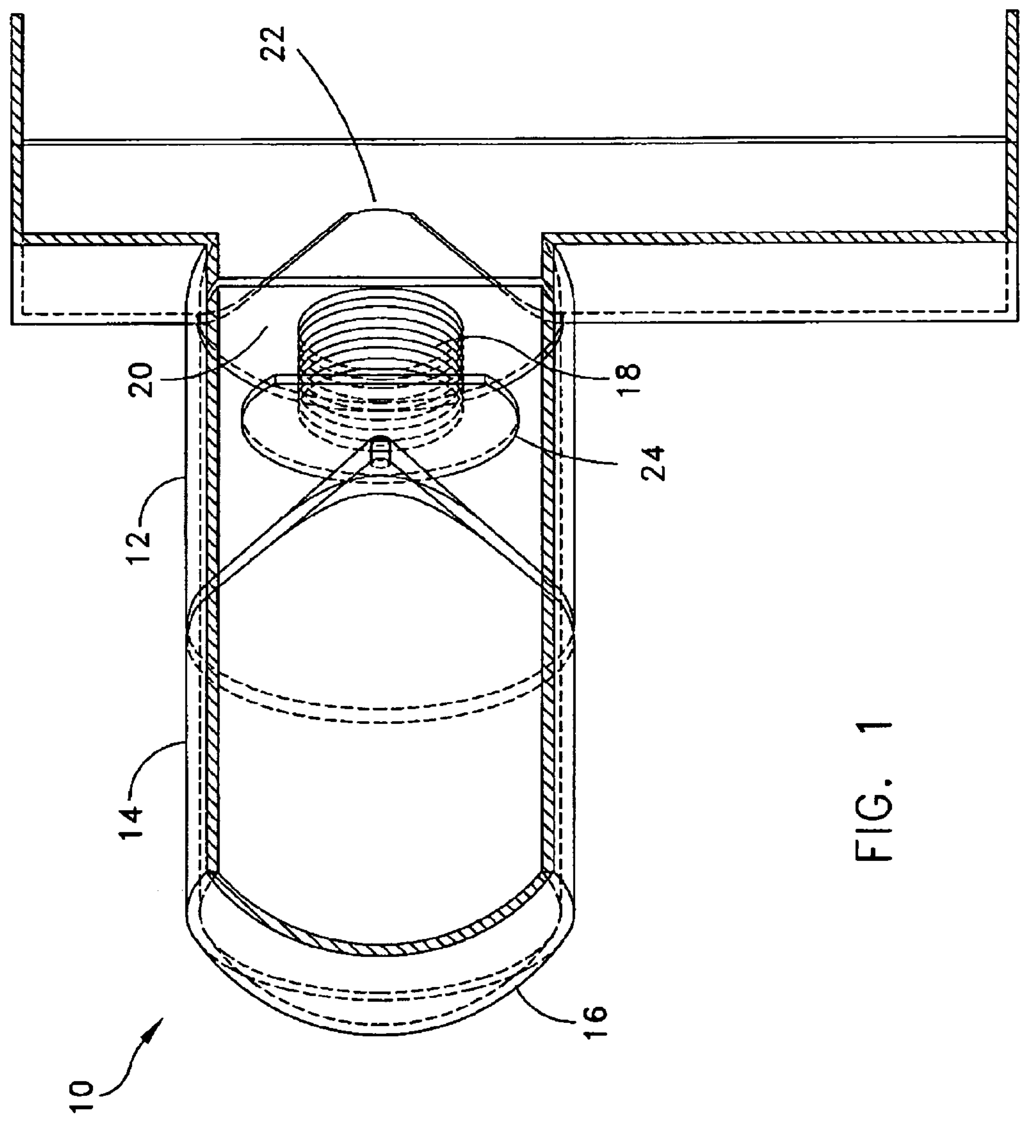
FIG. 1 is a cut away view of the buoyant antenna unit, winch, tether and housing mounted to the underwater vehicle.
Figure 2:
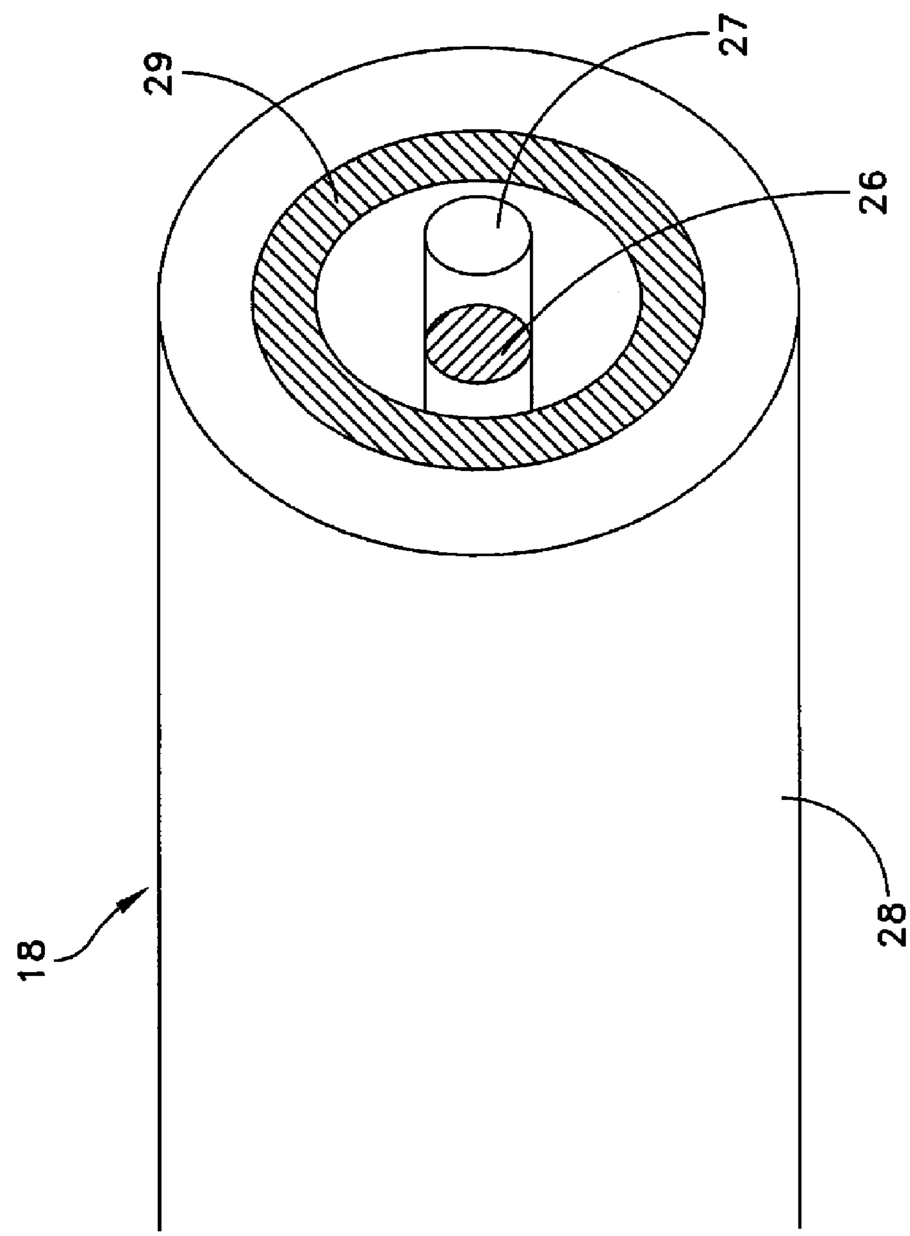
FIG. 2 is a cut away view of the fiber optic tether.
Figure 3:
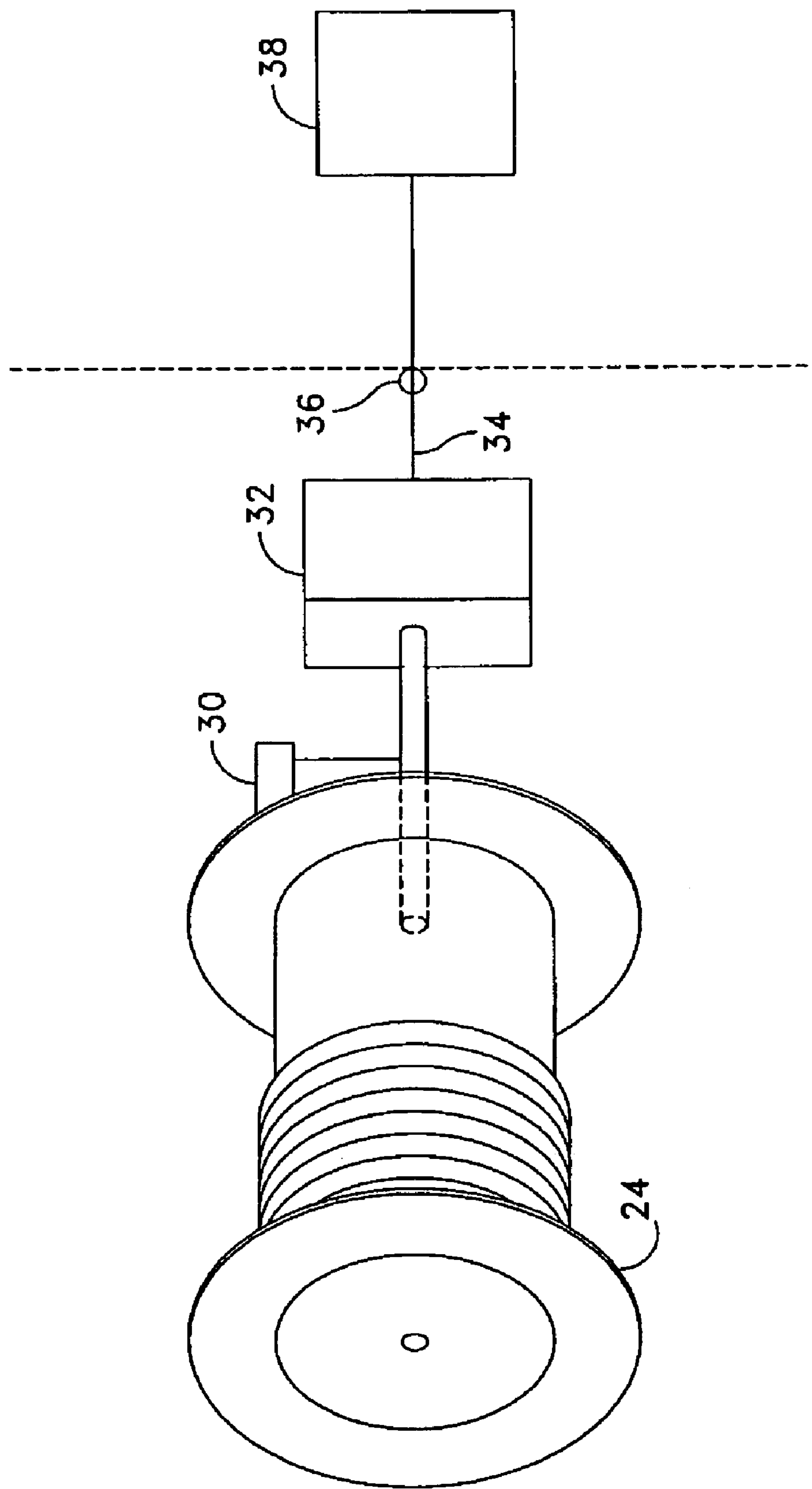
FIG. 3 is an illustration of the optical fiber payout/retrieval system.
Figure 4:
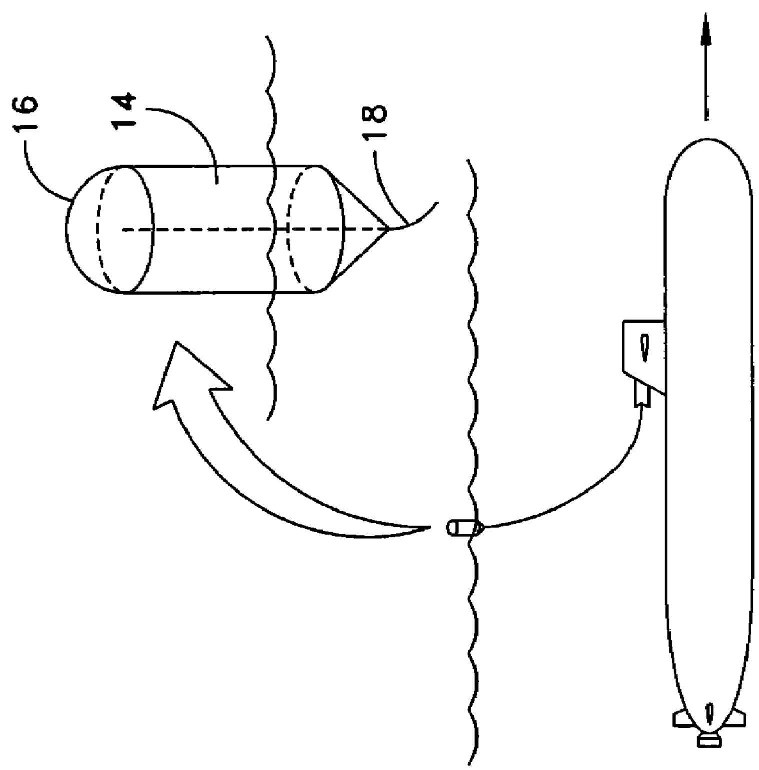
FIG. 4 is an illustration of the deployment, use and retrieval of the buoyant antenna unit.
Figure 4:
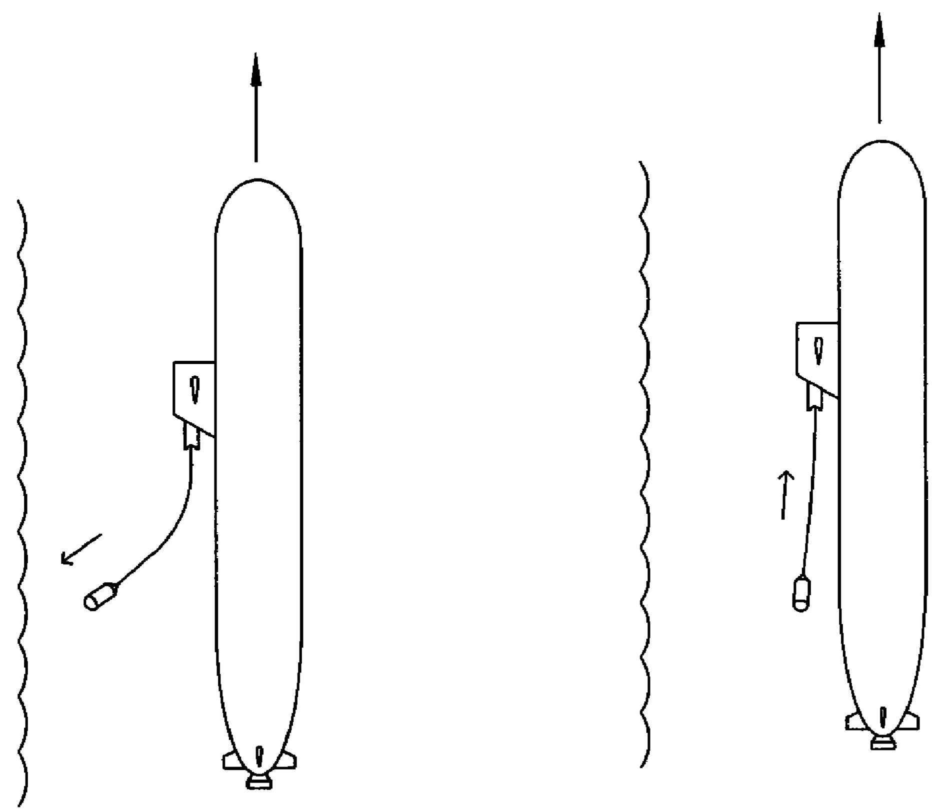

Referring to FIG. 1 there is illustrated an embodiment of the recoverable optical fiber tethered buoy assembly 10, which consists of a housing 12 mated to an integrated buoy 14 and antenna or sensor 16. The housing 12 contains an optical fiber tether 18 coupled to the antenna or sensor 16, and an optical fiber payout/retrieval system 20. The recoverable optical fiber tethered buoy assembly 10 has two configurations, a housed configuration as illustrated in FIG. 1 and a deployed configuration as illustrated in FIG. 4. The housing 12 can be made of a light weight carbon fiber material that is both robust and not subject to corrosion in salt water. The housing 12 can be bonded to an underwater vehicle by means of a water proof seal and retaining hardware. The housing 12 is preferably mounted to an aft non-moving surface of the underwater vehicle such as the sail. When the entire assembly 10 is in the housed configuration, the assembly 10 will provide very little additional drag to the underwater vehicle. The entire assembly 10 is no more than one meter long and weighs approximately thirty pounds. The buoy 14 is buoyant in water and can be filled with air or other gases or it can be made of Styrofoam or other buoyant material. The buoy 14 is cylindrical in shape with one end of the cylinder having a hemispherical shape and the other end having a conical shape. A conical mating system 22 on one end of housing 12 is used during buoy 14 retrieval, whereby the conical end of the buoy 14 fits into the inverse conical end of the housing 12. The inverse conically shaped end of the housing 12 forms means for mating the buoy 14. The conical end of the buoy 14 is weighted so that when it floats in water the hemispherical end clears the water's surface. This ensures that the antenna or sensor 16, which is integrated into the hemispherical end of the buoy 14, is able to transmit and receive radio or optic signals above the water's surface. The buoy 14 is approximately sixteen inches in diameter and about twenty four inches long and weighs approximately one hundred pounds with approximately two hundred forty pounds of buoyancy.

The optical fiber payout/retrieval system 20 pays out and retrieves the optical fiber tether 18 that is attached at one end to the buoy 14. The other end of the optical fiber tether 18 is attached to a winch 24. The optical fiber tether 18 has a core comprising an optical fiber 26 parallel to a small gauge wire 27, and a strength member 29 surrounded by a flexible jacket 28 made of a buoyant water proof polymer. This core of the optical fiber tether 18 provides power to charge energy storage within the buoy, and the signal path from the underwater vehicle to the antenna or sensor 16 integrated with the buoy 14. The cross sectional diameter of the optical fiber tether 18 is approximately three millimeters. The length of the optical fiber tether 18 should be at least 1500 meters. The optical fiber tether 18 spools around the winch 24 in the housed configuration and pays out in the deployed configuration similar to fishing line off of a reel. The winch 24 is equipped with an electronic winch sensor 30 that counts each complete revolution of the winch in order to measure the length of optical fiber tether 18 that pays out. The sensor also provides an indicator when the optical fiber tether 18 is completely unwound. The winch 24 is equipped with an electric motor 32 that will spin the winch 24 in order to reel in the optical fiber tether 18. The winch 24, the elecronic winch sensor 30 and the electric motor 30 together form means for paying out and retrieving the tether 18.

The electronic components such as the optical fiber tether 18 and the winch sensor 30 and the electric motor 32 interact with electronic and power systems on board the underwater vehicle through an electrical connection 34 that passes through a micro-aperture 36 in the hull of the underwater vehicle. The electrical connection 34 and the micro-aperture 36 together form means for powering the tethered buoy 14 from a power source internal to the underwater vehicle. The signal to and from the optical fiber core 26 as well as the signal from winch sensor 30 are directed to a user command component 38 such as a computer that allows on board means for user command and control of the assembly 10.

In the deployed configuration, as illustrated in FIG. 4, the assembly 10 can establish connectivity with the ocean surface as required while the underwater vehicle that it is attached to remains submerged. The buoy 14 will ascend to the surface by virtue of its buoyancy pulling out the optical fiber tether 18 from the winch 24. The winch 24 within the housing 12 keeps a small drag on the optical fiber tether 18 to prevent fouling. As the winch sensor 30 measures the length of remaining spooled optical fiber tether 18 as deployed, the information is relayed back to the user command component 38. When the buoy 14 breaks the surface of the water, it provides the antenna or sensor 16 an aperture for line of sight communications and satellite communications, GPS, a basic radar detection function, or visual imaging or laser communications. The buoy 14 stays essentially in one place relative to the ocean surface while the submerged vehicle can continue to move underwater, paying out the optical fiber tether 18 as it does. On command from the user command component 38, or at the end of the optical fiber tether 18 payout, the winch 24 will start to reel in the optical fiber tether 18 until the buoy 14 is re-docked into the conical mating system 22 of the housing 12.

The recoverable antenna buoy assembly 10 offers a weight advantage to next generation underwater vehicles over prior art systems. It is specifically designed for multiple uses over short periods of time and has decreased complexity and cost over prior art systems.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. A recoverable tethered buoy assembly for use with an underwater vehicle comprising:

a housing joined to the exterior of said underwater vehicle;

a means for paying out and retrieving a tether, said means for paying out and retrieving said tether contained in said housing;

a tether having two ends, said tether joined at a first end to said means for paying out and retrieving a tether;

a buoy having a cylindrically shaped body with a first end having a hemispherical shape and a second end having a conical shape, said buoy being joined to a second end of said tether;

a sensor integrated into said buoy;

a means for mating said buoy to said housing;

a means for powering said recoverable tethered buoy assembly from a power source internal to the underwater vehicle; and a means for user command and control of said assembly.

2. The recoverable tethered buoy assembly for use with an underwater vehicle of claim 1 wherein said means for paying out and retrieving a tether comprises:

a winch;

an electronic winch sensor capable of tracking and indicating the number of revolutions the winch has made; and an electric winch motor to power the winch.

3. The recoverable tethered buoy assembly for use with an underwater vehicle of claim 1 wherein said means for mating said buoy to said housing comprises an inverse conically shaped end of said housing that will allow the conically shaped end of said buoy to mate with the inverse conically shaped end of said housing.

4. The recoverable tethered buoy assembly for use with an underwater vehicle of claim 1 wherein said tether comprises an optical fiber;

a small gauge wire parallel to said optical fiber;

a strength member core surrounding said optical fiber and said small gauge wire; and a jacket disposed over said strength member, wherein said jacket is made of a buoyant water proof polymer.

5. The recoverable tethered buoy assembly for use with an underwater vehicle of claim 4 wherein said means for powering said recoverable tethered buoy assembly from a power source internal to the underwater vehicle comprises:

a micro aperture in the hull of said underwater vehicle;

an electrical connection to the power source internal to the underwater vehicle via the optical fiber to the assembly.

6. The recoverable tethered buoy assembly for use with an underwater vehicle of claim 4 wherein said means for user command and control of said assembly comprises a connection between said assembly and a computer internal to the underwater vehicle.

7. The recoverable tethered buoy assembly for use with an underwater vehicle of claim 1 wherein said housing is made of a light weight carbon fiber material that is both robust and not subject to corrosion in salt water.

8. The recoverable tethered buoy assembly for use with an underwater vehicle of claim 1 wherein said conical end of the buoy is weighted so that when it floats in water the hemispherical end clears the water's surface.

* * * * *